(12) United States Patent
Raghavendra et al.

(10) Patent No.: US 6,700,772 B2
(45) Date of Patent: Mar. 2, 2004

(54) INTEGRATED PASSIVE DEVICE AND METHOD FOR PRODUCING SUCH A DEVICE

(75) Inventors: Ramesh Raghavendra, Dundalk (IE); Clive A. Randall, State College, PA (US); Amanda L. Baker, Boalsburg, PA (US); Neil McLoughlin, Blackrock (IE)

(73) Assignee: Littlefuse Ireland Development Company Limited, Dundalk (IE)

( * ) Notice: Subject to any disclaimer, the term of this patent is extended or adjusted under 35 U.S.C. 154(b) by 205 days.

(21) Appl. No.: 09/903,030

(22) Filed: Jul. 11, 2001

(65) Prior Publication Data
US 2002/0043698 A1 Apr. 18, 2002

(30) Foreign Application Priority Data
Jul. 12, 2000 (EP) ............................................. 00650080

(51) Int. Cl.$^7$ .................................................. H01G 4/06
(52) U.S. Cl. ..................... 361/321.2; 361/311; 361/313; 361/306.3; 361/321.4
(58) Field of Search ........................... 361/321.2, 306.3, 361/311, 313, 322, 305, 308, 309, 321.1, 321, 321.4, 321.5, 303, 306.1

(56) References Cited

U.S. PATENT DOCUMENTS

| | | | |
|---|---|---|---|
| 4,811,164 A | * | 3/1989 | Ling et al. |
| 5,134,540 A | * | 7/1992 | Ruttt |
| 5,548,474 A | * | 8/1996 | Chen et al. |
| 5,739,742 A | * | 4/1998 | Iga et al. |
| 5,870,273 A | | 2/1999 | Sogabe et al. |
| 6,143,366 A | * | 11/2000 | Lu |

FOREIGN PATENT DOCUMENTS

| | | |
|---|---|---|
| EP | 0 270 099 A2 | 8/1988 |
| EP | 06208806 | 7/1994 |
| GB | 2 242 065 | 9/1991 |
| RU | 2021207 | 10/1994 |

* cited by examiner

Primary Examiner—Dean A. Reichard
Assistant Examiner—Nguyen T. Ha
(74) Attorney, Agent, or Firm—Bell, Boyd & Lloyd LLC

(57) ABSTRACT

An IPD has a varistor of electrodes and a ZnO dielectric. A capacitor includes electrodes and a dielectric that has oxides of bismuth, magnesium, and niobium having a pyrochlore structure of type $A_2B_2O_7$. The materials are applied as wet layers and are sintered for integrated production.

16 Claims, 7 Drawing Sheets

INTEGRATED PASSIVE DEVICE AND METHOD FOR PRODUCING SUCH A DEVICE

BACKGROUND OF THE INVENTION

The present invention generally relates to integrated passive devices (IPDs). More specifically, the present invention relates to IPDs that have two or more passive ceramics-based components.

The continuing drive for component count reduction and miniaturisation has led in recent years to integration of inductors or capacitors with resistors into single surface mount devices. However, various technical problems have prevented successful integration of a component with a varistor, and there has been particular difficulty with integration of a capacitor with a varistor. The approaches to date have involved use of barrier materials between the components, adding expense and preventing miniaturisation to the extent desired.

Integration of a varistor and a capacitor is described in U.S. Pat. No. 5,870,273. However, this structure has a high resistivity layer separating the devices and thus has a complex structure. Also, the production technique involves dry-stacking application of layers using tapes. Thus, there is little flexibility in the production process, and material cost is high.

The invention is thus directed towards providing an improved varistor/capacitor IPD and method of production.

SUMMARY OF THE INVENTION

According to the present invention, there is provided an integrated passive device that includes a varistor and a capacitor. The varistor and the capacitor each have a ceramic oxide dielectric and inner electrodes having similar thermal expansion and shrinkage characteristics, and there is no barrier layer between the varistor and the capacitor.

In one embodiment, the varistor dielectric is of ZnO material.

In another embodiment, the capacitor dielectric comprises bismuth and niobate-based oxides.

In a further embodiment, the capacitor dielectric further comprises magnesium-based oxides.

In one embodiment, the capacitor dielectric material has a pyrochlore structure.

In another embodiment, the varistor dielectric particle size is approximately 1.5 µm and the capacitor dielectric size is approximately 3.0 µm.

In one embodiment, each of the capacitor and the varistor comprises a plurality of layers of dielectric and inner electrodes.

In another embodiment, the capacitor electrodes and the varistor electrodes are of platinum material.

In a further embodiment, the device includes feed-through end terminations and external capacitor and varistor terminations.

According to another aspect of the present invention the invention provides a process of producing an integrated passive device. The method includes the steps of applying wet layers of the capacitor dielectric, the capacitor inner electrode, the varistor dielectric, and the varistor inner electrode materials; and sintering the layers to provide the integrated passive device.

In an embodiment, the varistor dielectric particle size is approximately 1.5 µm and the capacitor particle size is approximately 3.0 µm.

In another embodiment, the capacitor dielectric material is prepared by milling powder with deionized water to provide a slurry; drying the slurry to provide dried powder; calcinating the dried powder for six hours at approximately 800° C.; and adding solvent binders.

Additional features and advantages will be described in, and apparent from, the following Detailed Description of the Presently Preferred Embodiments and the Drawings.

DETAILED DESCRIPTION OF THE PRESENTLY PREFERRED EMBODIMENTS

Figure 1A:
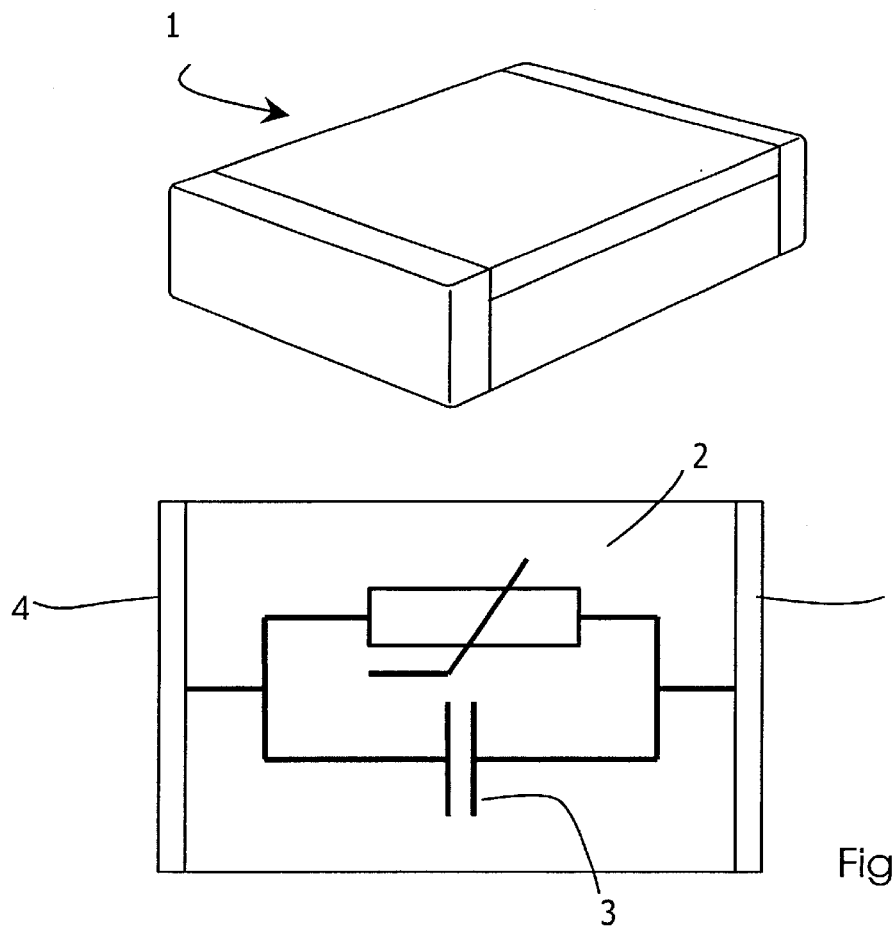
FIG. 1(a) is a perspective view of an integrated passive device of the present invention together with an equivalent circuit of the device.
Figure 1B:
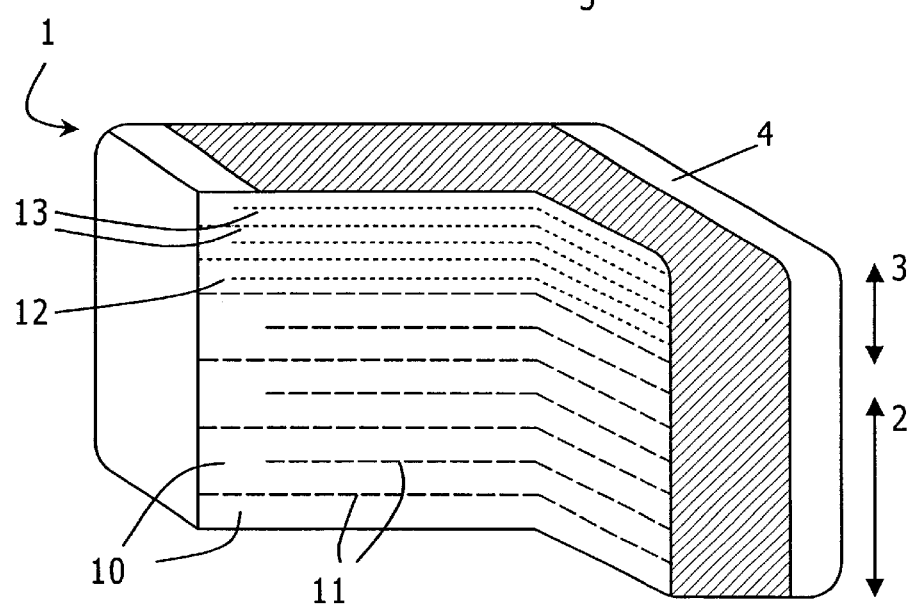
FIG. 1(b) is a diagrammatic cut-away view of the device of FIG. 1(a) showing the internal structure.

Referring to FIG. 1(a) a monolithic integrated passive device (IPD) 1 having a varistor 2 and a capacitor 3 is shown. The end terminations are indicated by the numeral 4. Referring to FIG. 1(b), the varistor 2 comprises layers 10 of dielectric material between electrodes 11. The capacitor 3 comprises layers 12 of dielectric material between electrodes 13.

The dielectric of the varistor 2 comprises ZnO with oxides of bismuth, antimony, cobalt and nickel as prime additive materials and having a Wurtzite structure. The particle size is approximately 1.5 µm. The varistor electrodes are of platinum material.

The capacitor electrodes are also of platinum material, and the dielectric is of bismuth, magnesium and niobium-based oxide materials having a pyrochlore unit structure of type $A_2B_2O_7$. The capacitor dielectric particle size is approximately 3.0 µm. The electrodes may alternatively be of silver palladium material.

The IPD 1 is produced using wet stacking process equipment which prints successive wet layers of dielectric and electrodes. The completed stacks are cofired to complete the IPD 1. There is no need for a barrier between the varistor and capacitor parts of the IPD 1.

In more detail, the capacitor dielectric composition is prepared as follows.

1. Powders are weighed as follows.

| Compound | wt % range |
|---|---|
| $Bi_2O_3$ | 59–65 |
| $MgCO_3$ | 9–14 |
| $Nb_2O_5$ | 20–34 |

In one example, the precise composition is 63% $Bi_2O_3$, 7% $MgCO_3$, and 30% $Nb2O_5$.

2. Mill for two hours with deionized water.
3. Dry slurry at 80° C. to provide a dried powder.
4. Calcine dried powder for 6 hours at 800° C.
5. Add pine oil (21% w.w.), dipentene (4% w.w.), ethyl cellulose (0.5% w.w.), and zirconia media (200% w.w.) to the calcined powder as sacrificial solvent binders.
6. Add ethyl cellulose at a proportion of 2.8% w.w.
7. Make any required adjustments to solvent content to achieve viscosity of 15PaS to 25 PaS.

The varistor dielectric ZnO materials are prepared by:

(i) blending the additive materials with ZnO and calcining them at 920° C., (ii) vibromilling and ball milling with organic binders for 24 hr to provide an average particle size of approximately 1.5 µm, and (iii) shear mixing and ageing at 55° C. for 15 hr.

The layers are screen printed in the order illustrated in FIG. 1(b) on a glass plate containing self-adhesive nylar. The wet stack samples are released using ultrasonic vibration, placed in zirconia setter plates, and then sintered at a temperature in the range of 1060° C. to 1100° C. for a time duration of 2 to 4 hours.

The resultant IPD has a capacitor portion in which the dielectric has a pyrochlore structure of $A_2B_2O_7$ arising from the materials composition. In the pyrochlore structure, A (corresponding to the larger cation) arises from the bismuth, and B (corresponding to the smaller cation) arises from the magnesium and niobium.

The layers have substantially similar thermal expansion and shrinkage characteristics for sintering. Choice of sintering temperature within this range has an effect on the electrical characteristics of the IPD 1, as demonstrated in Table 1 below.

TABLE 1

| Dielectric constant @ 1060° C. | Dielectric constant @ 1100° C. | Dielectric loss @ 1060° C. | Dielectric loss @ 1100° C. |
|---|---|---|---|
| 170 | 177 | 0.001 | 0.0024 |

Figure 2:
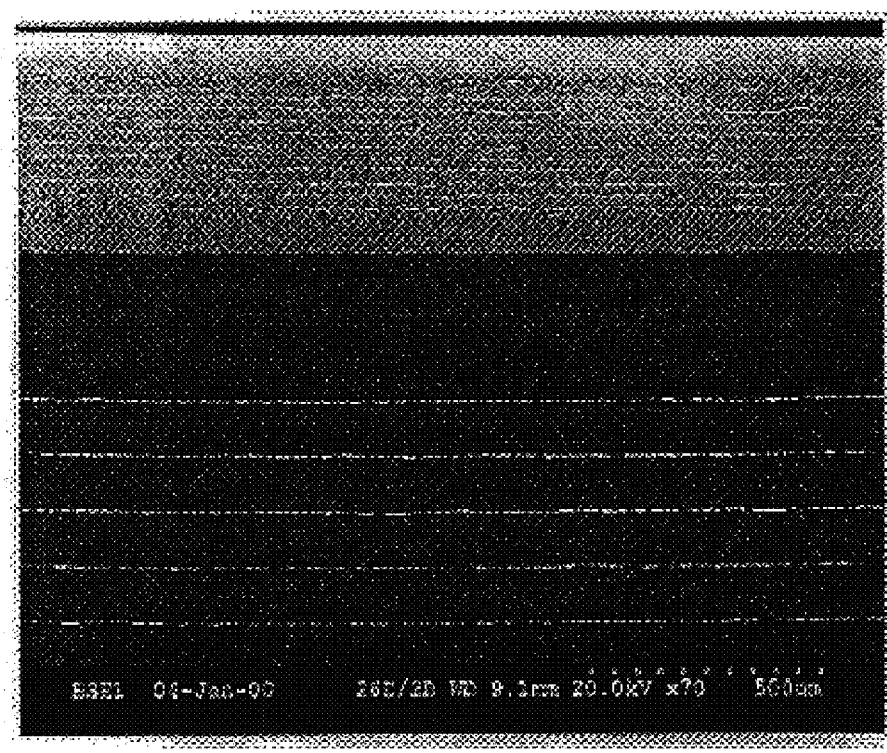
FIG. 2 is a photograph showing the layered structure of the integrated passive device.

The layered structure of the IPD 1 is shown in FIG. 2, from which it is clear that it has excellent mechanical and chemical integrity.

Samples are then rumbled (to chamfer the edges) for 20 minutes and are end terminated using silver palladium paste, fired at 800° C.

Figure 3:
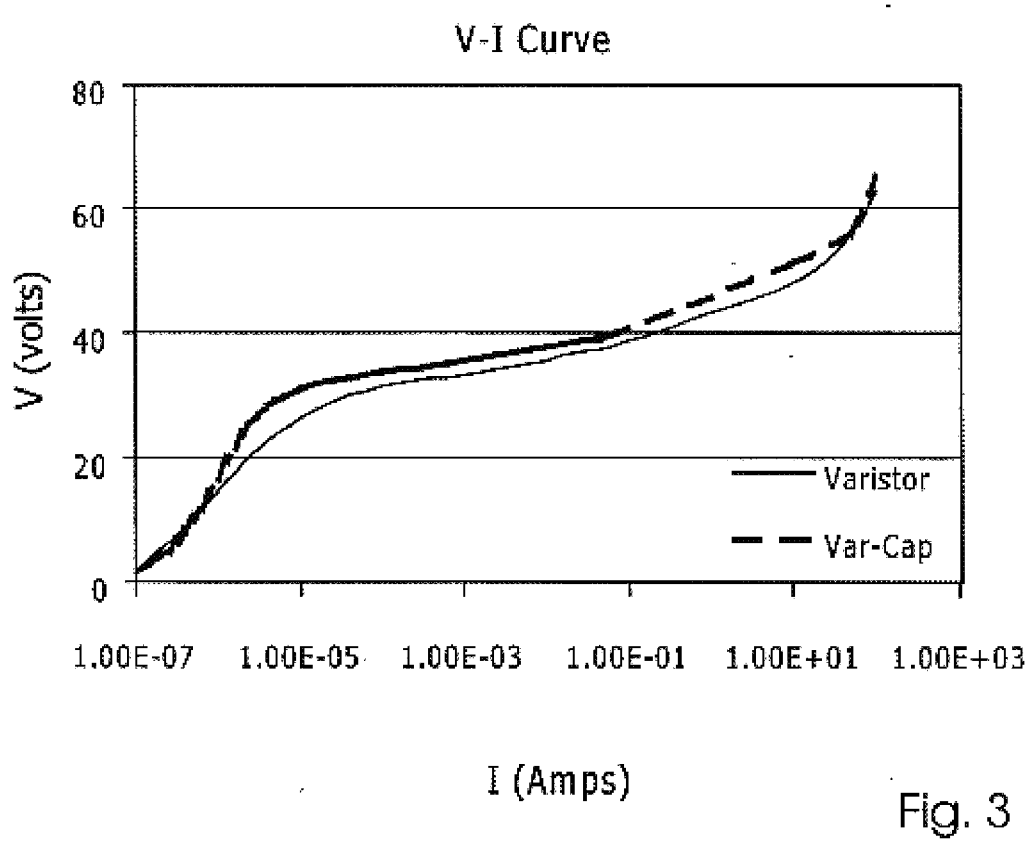
FIGS. 3 to 7 are plots illustrating characteristics of the integrated passive device of the present invention.
Figure 4:
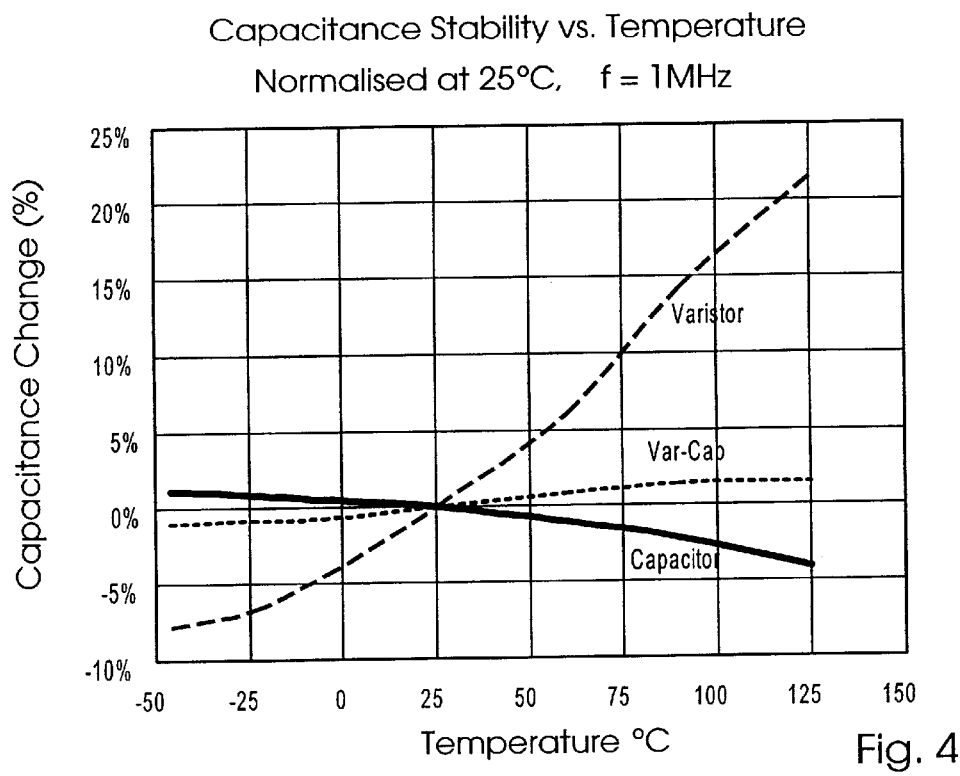
Figure 5:
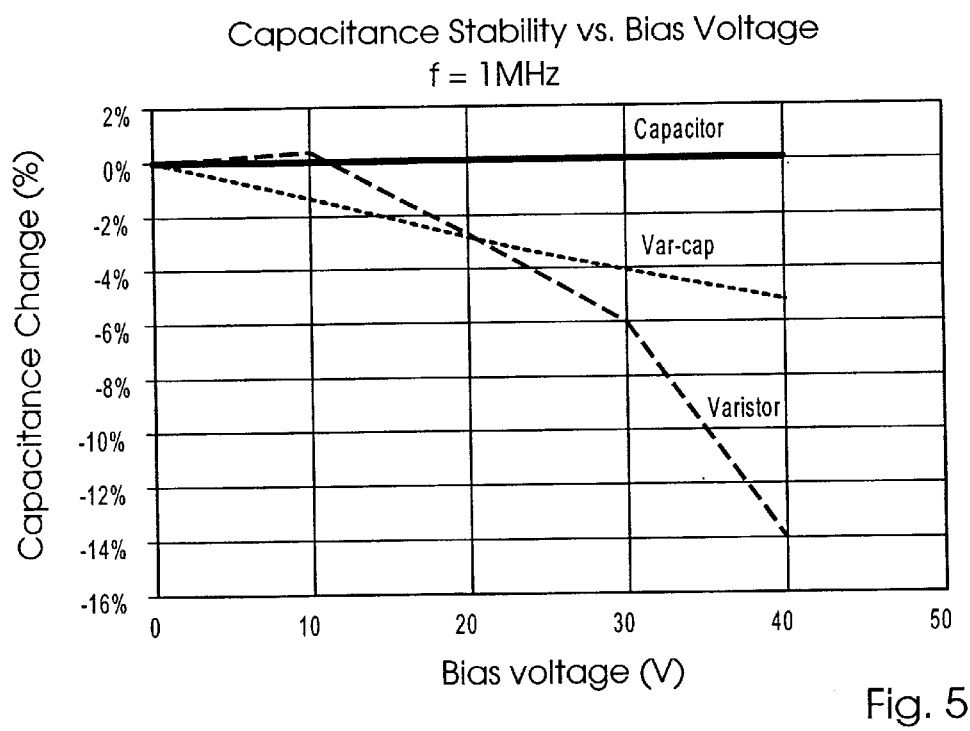
Figure 6:
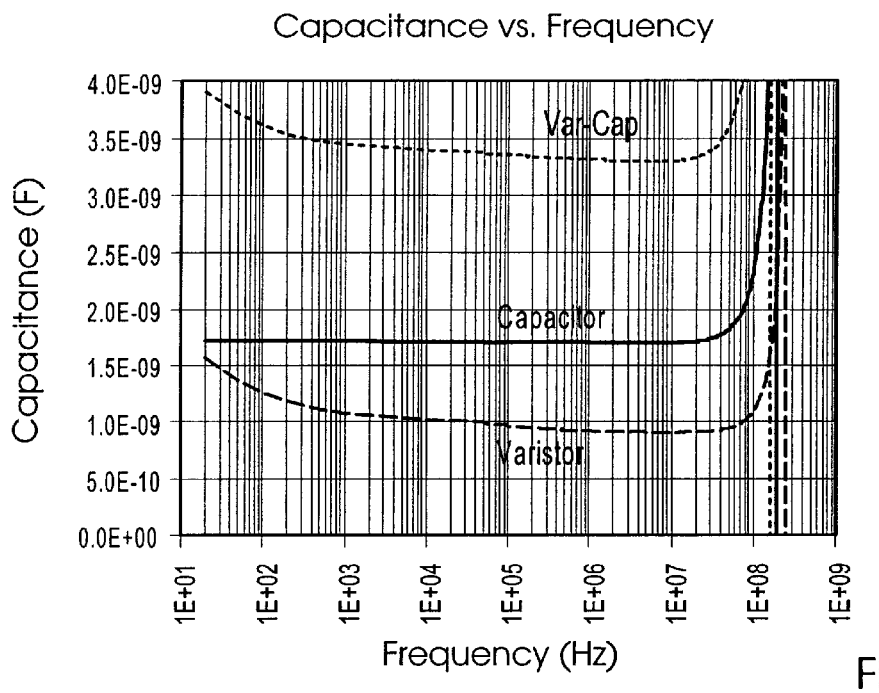

The electrical properties of the IPD 1 were analyzed and the results are set out in FIGS. 3 to 7. The comparisons are with a discrete varistor and a discrete capacitor as appropriate, having the same materials. As shown in FIG. 3 there are very similar V-I varistor curves. FIG. 4 is a plot of capacitance stability versus temperature for the IPD 1 ("Var-Cap") and a discrete varistor and capacitor, and FIG. 5 is a plot of capacitive stability vs. bias voltage for these devices.

The electrical characteristics of the discrete multilayer capacitor are first examined. As can be seen from FIGS. 4 to 6, the capacitor formulation is quite stable over the temperature range −40 to +125° C. with less than 5% change in capacitance, and practically no change in capacitance over frequency and bias voltage. Many capacitors have a capacitance which changes with applied ac or dc voltage. The pyrochlore-based capacitor formulation of the invention is very stable against biased voltage (FIG. 5).

Figure 7:
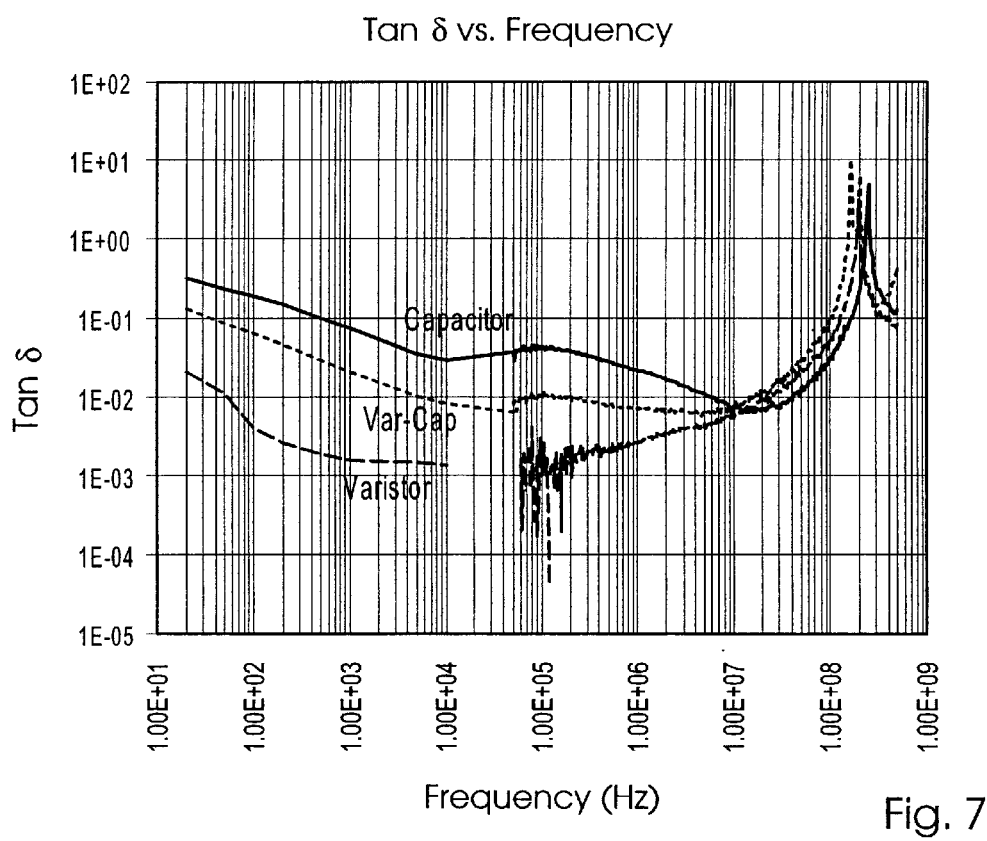

As can be seen from the electrical results (FIGS. 3 to 7), cofiring has not in any way deteriorated varistor properties. On the other hand it has provided added value to the varistor. The V-I curve shown in FIG. 3 indicates improved leakage characteristics for the varistor as a result of co-firing. A more dramatic observation is the remarkable stability of the capacitance over the entire temperature range (−40 to +125° C.) for the cofired device (FIG. 4). The inherent capacitance of the varistor changes by 30% over the temperature range. In contrast, the cofired varistor/capacitor device changes by less than 3%. Tan 6 is also quite stable over the range of frequency for the co-fired parts (FIG. 7).

In addition to the above characterization, reliability testing was also performed which included temperature cycling in as-board mount condition (25 cycles: −55° C. to +125° C.), biased humidity (48 hrs: 85° C./85% RH humidity) and accelerated life testing (85° C.) to ensure that the interface withstands the stringent criteria required for the integrated devices. All IPDs withstood the tests and exhibited less than 3% change in the nominal voltage and leakage characteristics.

Table 2 below lists the device ratings and characteristics for three varistor-capacitor IPDs. Note that the voltage rating is determined solely by the varistor element characteristics.

TABLE 2

Device ratings and characteristics of IPD devices.

| | MAXIMUM RATING (125° C.) | | | CHARACTERISTICS (25° C.) | | | | |
|---|---|---|---|---|---|---|---|---|
| | CONTINUOUS | | TRANSIENT | | VARISTOR VOLTAGE | | MAXIMUM CLAMPING | CAPACITANCE f = |
| | | | ENERGY | PEAK CURRENT | 1 mA DC | | VOLTAGE | 1 MHz |
| | DC | RMS | 2ms or 10/1000 µs | 8/20 µs $I_{TM}$ | $V_{NOM}$ | $V_{NOM}$ | 8/20 µs | C |
| | $V_{M(DC)}$ VOLTS | $V_{M(AC)}$ VOLTS | $W_{TM}$ JOULES | 1 × PULSE AMPS | MIN VOLTS | MAX VOLTS | $V_C$ VOLTS | $I_{PK}$ AMPS | PF (+10%—20%) |
| V18-0805 | 18 | 14 | 0.3 | 120 | 22 | 28 | 40 | 5 | 1200 |
| V26-1210 | 26 | 20 | 1.2 | 300 | 29.5 | 38.5 | 54 | 10 | 3300 |
| V33-1210 | 33 | 26 | 1.2 | 300 | 38 | 49 | 72 | 10 | 3300 |

As can be seen from these plots of electrical results, cofiring of the capacitor formulation has not deteriorated varistor properties. In fact it has improved leakage characteristics and has provided added value to the varistor. The key electrical features of the cofired varistor-capacitor IPD 1 shown in FIGS. 3–7 can be summarized as follows:

Enhanced EMI suppression capabilities

Discrete capacitor/varistor replacement

Enhanced capacitance stability over temperature, frequency and bias voltage

Devices have operating temperature range between −55 to 125° C.

Low inductance package.

In addition, these cofired devices possess better clamping of fast transients such as ESD.

Figure 8:
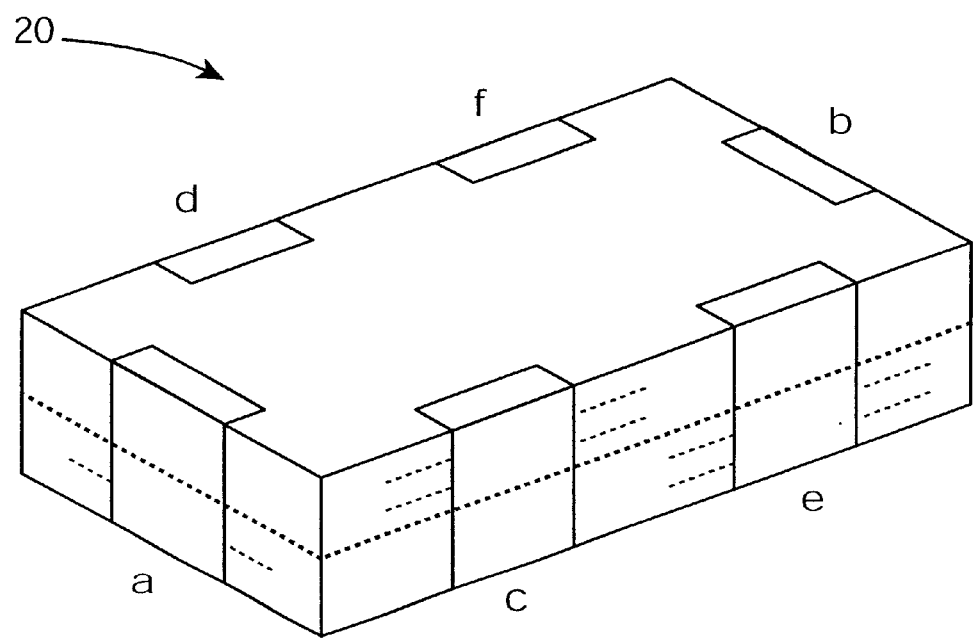
FIG. 8 is a diagrammatic perspective view of an IPD feed-through device of the present invention.
Figure 9:
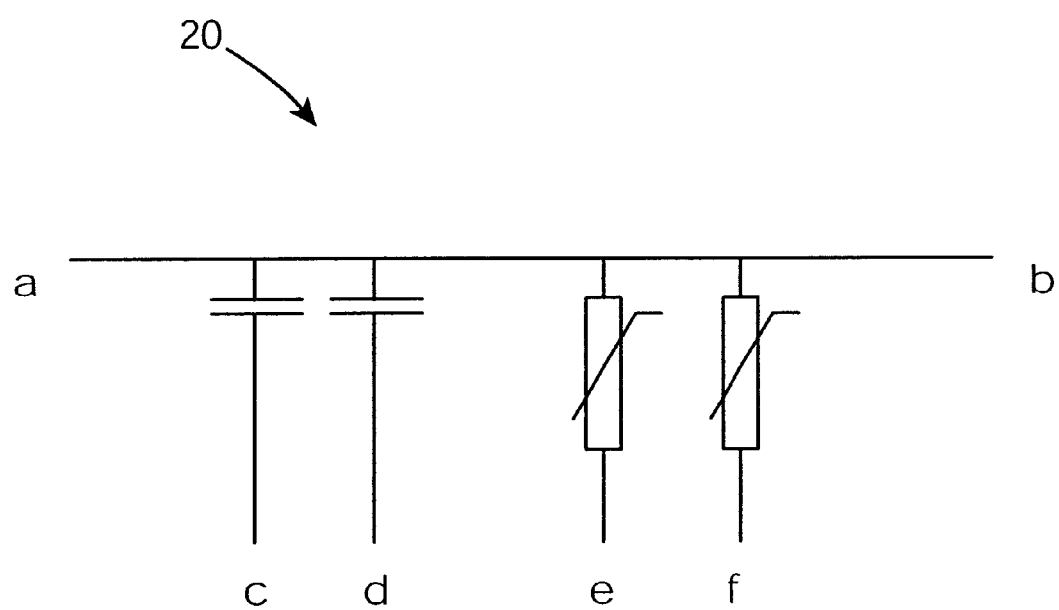
FIG. 9 is a circuit diagram of the integrated passive device of the present invention.
Figure 10A:
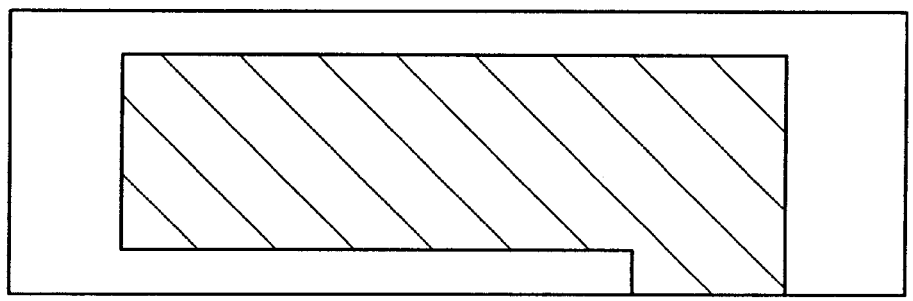
FIGS. 10(a) and 10(b) are plan views of inner electrodes of the integrated passive device of FIGS. 8 and 9.
Figure 10B:
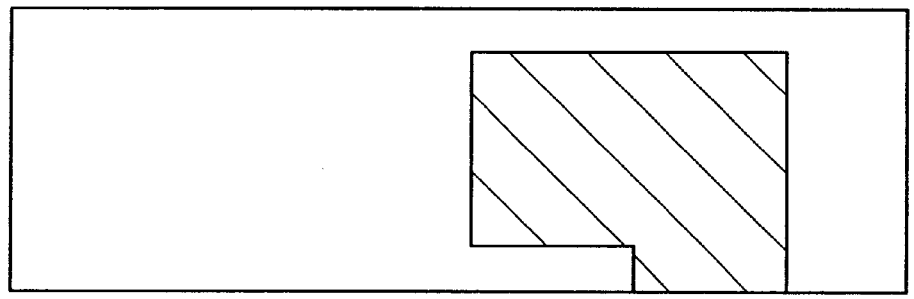

Referring to FIGS. 8 and 9 an IPD 20 of the invention is illustrated. The overall IPD has feed through terminations "a" and "b", capacitor terminations "c" and "d", and there are two varistors terminate at "e" and "f". This is achieved by applying the wet stack layers so that they are in electrical contact with the relevant termination when the termination is applied after sintering. In the wet stack process the electrodes are offset so that the capacitor and the varistor can have independent feed through electrodes. Referring to FIGS. 10(a) and 10(b), the electrodes may occupy most of the area (FIG. 10(a)) or only part (FIG. 10(b)).

It will be appreciated that a low loss, medium dielectric constant, temperature, frequency and bias voltage stable capacitor material has been developed and has been successfully cofired with conventional zinc oxide-based varistor materials without the need for either a barrier or an interlayer material. These devices have characteristics suitable for high-frequency/low-pass filter circuit functions, thereby providing suppression and filtering in a single package. Indeed a capacitor having the structure described, without a varistor, has excellent filtering characteristics.

The invention is not limited to the embodiments described herein but may be varied in construction and detail. Such variations will be apparent to those skilled in the art. For example, it is envisaged that the capacitor dielectric material may not include magnesium oxides, and may instead have zinc oxides instead. Also, the inner electrodes may be of silver palladium material instead of platinum. Also, the electrode material may be mixed during preparation with an oxide of a dielectric. Such changes and modifications may be made without departing from the spirit and scope of the present invention and without diminishing its attendant advantages.

What is claimed is:

1. An integrated passive device comprising a varistor and a capacitor, wherein the varistor and the capacitor each comprise a ceramic oxide dielectric and inner electrodes having similar thermal expansion and shrinkage characteristics, and in which there is no barrier layer between the varistor and the capacitor, the varistor and the capacitor being joined at a ceramic-to-ceramic interface without an electrode located at the interface.

2. The integrated passive device of claim 1, wherein the varistor dielectric is of ZnO material.

3. The integrated passive device of claim 1, wherein the capacitor dielectric comprises bismuth and niobate based oxides.

4. The integrated passive device of claim 2, wherein the capacitor dielectric comprises bismuth and niobate based oxides.

5. The integrated passive device of claim 3, wherein the capacitor dielectric further comprises magnesium-based oxides.

6. The integrated passive device of claim 1, wherein the capacitor dielectric material has a pyrochlore structure.

7. The integrated passive device of claim 3, wherein the varistor dielectric particle size is approximately 1.5 $\mu$m and the capacitor dielectric size is approximately 3.0 $\mu$m.

8. The integrated passive device of claim 5, wherein the varistor dielectric particle size is approximately 1.5 $\mu$m and the capacitor dielectric size is approximately 3.0 $\mu$m.

9. The integrated passive device of claim 6, wherein the varistor dielectric particle size is approximately 1.5 $\mu$n and the capacitor dielectric size is approximately 3.0 $\mu$m.

10. The integrated passive device of claim 1, wherein each of the capacitor and the varistor comprises a plurality of layers of dielectric and inner electrodes.

11. The integrated passive device of claim 1, wherein the capacitor electrodes and the varistor electrodes are of platinum material.

12. The integrated passive device of claim 1, wherein the device further comprises feed through end terminations and external capacitor and varistor terminations.

13. A process of producing an integrated passive device, as claimed in claim 1, the process comprising the steps of:

applying wet layers of the capacitor dielectric, a capacitor inner electrode, a varistor dielectric, and a varistor inner electrode materials; and sintering the layers to provide the integrated passive device.

14. The process of claim 13, wherein the varistor dielectric particle size is approximately 1.5 $\mu$m and the capacitor particle size is approximately 3.0 $\mu$m.

15. The process of claim 13, wherein the capacitor dielectric material is prepared by:

milling powder with deionized water to provide a slurry, drying the slurry to provide dried powder;

calcinating the dried powder for six hours at approximately 800° C.; and adding solvent binders.

16. An integrated passive device as claimed in claim 1, wherein the capacitor comprises a dielectric pyrochlore structure $A_2 B_2 O_7$, in which A corresponds to a first cation having a first size and comprises bismuth, and B corresponds to a second cation having a second size smaller then the first size and comprises magnesium and niobium.

* * * * *